United States Patent
Kowalchuk (10) Patent No.: US 9,730,377 B2
(45) Date of Patent: Aug. 15, 2017

(54) PLANTER WITH ON-BOARD SEED TREATMENT

(71) Applicant: CNH Industrial Canada, Ltd., Saskatoon (CA)

(72) Inventor: Trevor L. Kowalchuk, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 2 days.

(21) Appl. No.: 14/751,521

(22) Filed: Jun. 26, 2015

(65) Prior Publication Data
US 2016/0374260 A1 Dec. 29, 2016

(51) Int. Cl.
| | |
|---|---|
| *A01C 1/06* | (2006.01) |
| *A01C 7/08* | (2006.01) |
| *A01C 21/00* | (2006.01) |
| *A01C 7/20* | (2006.01) |
| *A01C 7/06* | (2006.01) |

(52) U.S. Cl.
CPC .............. *A01C 1/06* (2013.01); *A01C 7/082* (2013.01); *A01C 7/20* (2013.01); *A01C 21/005* (2013.01); *A01C 7/06* (2013.01)

(58) Field of Classification Search
CPC .............. A01C 1/00; A01C 1/06; A01C 1/08
USPC .................................................. 111/127–129
See application file for complete search history.

(56) References Cited

U.S. PATENT DOCUMENTS

| | | | |
|---|---|---|---|
| 3,848,772 A | 11/1974 | Aanestad et al. | |
| 4,239,010 A | 12/1980 | Amburn | |
| 4,240,365 A | 12/1980 | Amburn | |
| 4,356,934 A | 11/1982 | Knake | |
| 4,503,803 A | 3/1985 | Barnes | |
| 6,155,185 A | 12/2000 | Memory et al. | |
| 6,582,516 B1 | 6/2003 | Carlson | |
| 7,869,902 B2 | 1/2011 | Hunter et al. | |
| 8,365,679 B2 | 2/2013 | Landphair et al. | |
| 2002/0121047 A1 | 9/2002 | Thrash | |
| 2008/0009962 A1 | 1/2008 | Hood et al. | |
| 2011/0027479 A1 | 2/2011 | Reineccius et al. | |
| 2013/0269578 A1* | 10/2013 | Grimm | A01C 7/06 111/127 |

(Continued)

FOREIGN PATENT DOCUMENTS

| | | | | |
|---|---|---|---|---|
| GB | 2516061 A * | 1/2015 | | A01C 1/06 |
| WO | WO2014005319 | 9/2014 | | |

OTHER PUBLICATIONS

EnviroPac Specifications, copyright 2002, Enviropac, Inc., 2 pages, www.enviropacinc.com/spec.htm.

*Primary Examiner* — John G Weiss
(74) *Attorney, Agent, or Firm* — Rebecca L. Henkel; Rickard K. DeMille (57) ABSTRACT

A planter is provided with onboard seed treatment for treating seeds on the go during row-crop planting of an agricultural field. The seed treatment system of the planter allows for selective planting of specific zones of a field with treated seed, which may include planting different zones of the field with seeds having different treatments. The planter may store untreated seed in bulk and include a seed treatment system that selectively and precisely treat the untreated seeds during treatment events by way of an injection or spray nozzle system that applies liquid treatment to the seeds traveling along a tightly defined travel path, such as within pockets of a belt that carries the seeds through a seed tube.

13 Claims, 9 Drawing Sheets

(56) References Cited

U.S. PATENT DOCUMENTS

| | | | | |
|---|---|---|---|---|
| 2013/0333602 A1* | 12/2013 | Carr | ........................ | A01C 7/16 111/171 |
| 2014/0048002 A1 | 2/2014 | Grimm et al. | | |
| 2014/0083358 A1 | 3/2014 | Reineccius et al. | | |
| 2015/0359164 A1* | 12/2015 | Bardi | ....................... | A01C 1/00 47/57.6 |

* cited by examiner

PLANTER WITH ON-BOARD SEED TREATMENT

FIELD OF THE INVENTION

The invention relates generally to planters and, in particular, to planters with on-board seed treatment for treating seeds during row-crop planting.

BACKGROUND OF THE INVENTION

Modern farming practices strive to increase yields of agricultural fields. Treated seeds are coated with substances such as fungicides, herbicides, and/or fertilizer that can improve performance of seeds based on particular agronomic characteristics of a field. Farmers typically preorder treated seed well in advance of the planting season in order to ensure availability and get reasonable prices. However, agronomic characteristics of a field can change, sometimes quickly, whereby preordering is partly speculation on what treatment(s) will be best for a particular year. For example, there may be a report on a particular bug infestation immediately before the planting season. If the particular bug infestation is not adequately controlled by the pre-ordered treatment(s) of the seeds, then additional application of a corresponding pesticide may be required or the crop may be left vulnerable to the bug. Furthermore, handling treated seeds requires considerable care, and disposing of leftover treated seeds can be challenging because pretreated seeds can be hazardous to, for example, livestock and wildlife. Small quantities of leftover treated seeds can sometimes be planted, according to seed company instructions and government regulations, in fallow or non-cropped land on the farm which takes labor, equipment, time, and fuel and requires additional handling of the treated seeds. Disposing of large quantities of treated seeds has to be done according to the seed company instructions and government regulations which can be time-consuming and may require the treated seeds to be moved off the farm for disposal.

SUMMARY OF THE INVENTION

The present invention is directed to a planter with onboard seed treatment for treating seeds on the go during row-crop planting of an agricultural field. The seed treatment system of the planter allows for selective planting of specific zones of a field with treated seed, which may include planting different zones of the field with seeds having different treatments. This allows the user to have reduced exposure to treatment materials by only handling the treatment materials for loading storage tanks on the planter while ensuring that only untreated seeds are handled by the user. Only as much seed is treated on the go as is needed for planting the treated seed application zones, eliminating leftover treated seeds. Treatment type selection can be optimized by accurately selecting a treatment at a time that is close to the planting session based on the most recent agronomic information at that time. This also provides flexibility to change seed varieties and alter the particular treatment applied to the seed, including while planting.

The planter may store only untreated seed in the bulk-fill or on-row hoppers and have a seed treatment system that treats the seed on the go, which may include treating seeds after singulation but before release from the planter. The seed treatment system may precisely treat the seeds by way of an injection or spray nozzle system that applies liquid treatment to the seeds traveling along a tightly defined travel path and substantially regular time spacing. This may be done by way of a seed tube with a treatment section for delivering the liquid treatment at a precise location and a belt that directs the singulated seeds from the seed meter through the treatment section for synchronized receipt of the liquid treatment before leaving the seed tube for delivery onto the agricultural field.

According to one aspect of the invention, a planter with on-board seed treatment is provided for treating seeds during row-crop planting of an agricultural field. The planter includes a frame supporting multiple row units. A seed storage system stores untreated seeds on the planter. A seed-metering system at each of the multiple row units selectively receives the untreated seeds from the seed storage system and singulates the untreated seeds for individual release toward the agricultural field. A seed treatment system includes a treatment storage system configured to store a volume of liquid seed treatment on the planter. A treatment application system is configured to apply the liquid seed treatment to the untreated seeds while the untreated seeds are delivered from the seed metering system to the agricultural field. This converts the untreated seeds to treated seeds during seed treatment events while planting.

According to another aspect of the invention, each row unit may include a seed tube configured to direct the individual seeds released from the seed-metering system toward the agricultural field. The treatment application system may be configured to apply the liquid seed treatment to the untreated seeds while the untreated seeds are in the seed tube to convert the untreated seeds to treated seeds during the seed treatment events. The seed tube may include a treatment section and the liquid seed treatment may be applied to the untreated seeds at the treatment section of the seed tube.

According to another aspect of the invention, the seed tube may include a seed tube housing surrounding an interior seed tube housing cavity. A belt may be arranged to rotate within the seed tube housing cavity for directing the untreated seeds through the treatment section of the seed tube and out of the seed tube as treated seeds toward the agricultural field. The belt may have an outer belt surface and belt fingers extending outwardly from the outer belt surface with belt pockets defined between adjacent pairs of the belt fingers. The belt pockets maybe configured to receive untreated seeds from the seed-metering system and convey the untreated seeds through the treatment section of the seed tube to receive the liquid seed treatment during the seed treatment events and direct the treated seeds out of the seed tube toward the agricultural field.

According to another aspect of the invention, the treatment application system may include a pump configured to deliver the liquid seed treatment to the untreated seeds in discrete pulses during the seed treatment events. The pump may be a peristaltic pump configured to deliver the liquid seed treatment in discrete pulses to the untreated seeds during the seed treatment events. The peristaltic pump may include a pump housing defining a pump cavity and a hose arranged with the pump cavity directing the liquid seed treatment through the pump. A rotor may be arranged within the pump cavity and configured to rotate and engage the hose to progressively squeeze the hose for delivering the treatment liquid out of the peristaltic pump in discrete pulses during the seed treatment events.

According to another aspect of the invention, the treatment application system may include a treatment nozzle that is arranged at the treatment section of the seed tube for delivering the liquid seed treatment into the seed tube housing cavity during the seed treatment events. The treatment nozzle may be configured to deliver the liquid seed treatment in discrete pulses during the seed treatment events. The treatment nozzle may be a piezoelectric nozzle configured to release bursts of the liquid seed treatment during corresponding seed treatment delivery events.

According to another aspect of the invention, the seed tube may include a sensor section arranged upstream of the treatment section of the seed tube. The sensor section is configured for detecting untreated seeds passing through the seed tube for coordinating application of the liquid seed treatment to the untreated seeds during the seed treatment events. A sensor may be arranged for detecting the presence of untreated seeds in the seed tube, such as within belt pockets of a rotating belt within the seed tube, for coordinating discrete releasing of bursts of the liquid seed treatment during the seed treatment events.

According to another aspect of the invention, the treatment storage system may include a first treatment storage tank holding a first liquid seed treatment and a second treatment storage tank holding a second liquid seed treatment. The treatment application system may include a selector valve assembly arranged between the first and second treatment storage tanks and the treatment section of the seed tube. The selector valve assembly may be configured to actuate for selectively directing at least one of the first and second liquid seed treatments to the treatment section of the seed tube.

According to another aspect of the invention, the treatment storage system includes a first treatment storage tank holding a first liquid seed treatment and a second treatment storage tank holding a second liquid seed treatment. The treatment application system may include a first treatment nozzle arranged at the treatment section of the seed tube receiving the first liquid seed treatment from the first treatment storage tank. The first nozzle can deliver the first liquid seed treatment at the treatment section of the seed tube during seed treatment events of the first liquid seed treatment. A second treatment nozzle may be arranged at the treatment section of the seed tube receiving the second liquid seed treatment from the second treatment storage tank. The second nozzle can deliver the second liquid seed treatment at the treatment section of the seed tube during seed treatment events of the second liquid seed treatment.

According to another aspect of the invention, a control system may control the selector valve and/or first and second nozzles or corresponding feed valves of the first and second nozzles to selectively plant treated seeds treated with the first liquid treatment, the second liquid treatment, both the first and second liquid treatments, or neither the first nor second liquid treatments for planting untreated seeds, based on the particular zone being planted of the agricultural field.

According to another aspect of the invention, a method of on-board seed treatment during row-crop planting of an agricultural field includes storing untreated seeds on a planter having multiple row units. A volume of liquid seed treatment is stored on the planter. The untreated seeds may be delivered to a seed meter at each row unit for singulating the seeds for individual release onto the agricultural field. The untreated seeds may be released from the seed meter at each row unit into a seed tube having a belt with belt pockets receiving the singulated untreated seeds from the seed meter. The liquid seed treatment may be delivered to a treatment section of the seed tube. The liquid seed treatment may be applied to the untreated seeds while the untreated seeds move through a treatment section of the seed tube. This may be done by releasing bursts of the liquid seed treatment into the belt pockets to convert the untreated seeds to treated seeds in the treatment section of the seed tube during seed treatment events while planting. The presence of untreated seeds in the belt pockets may be detected and the detection of untreated seeds may be used to coordinate release of the bursts of the liquid seed treatment into the belt pockets based on the detected presence of untreated seeds in the belt pockets.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
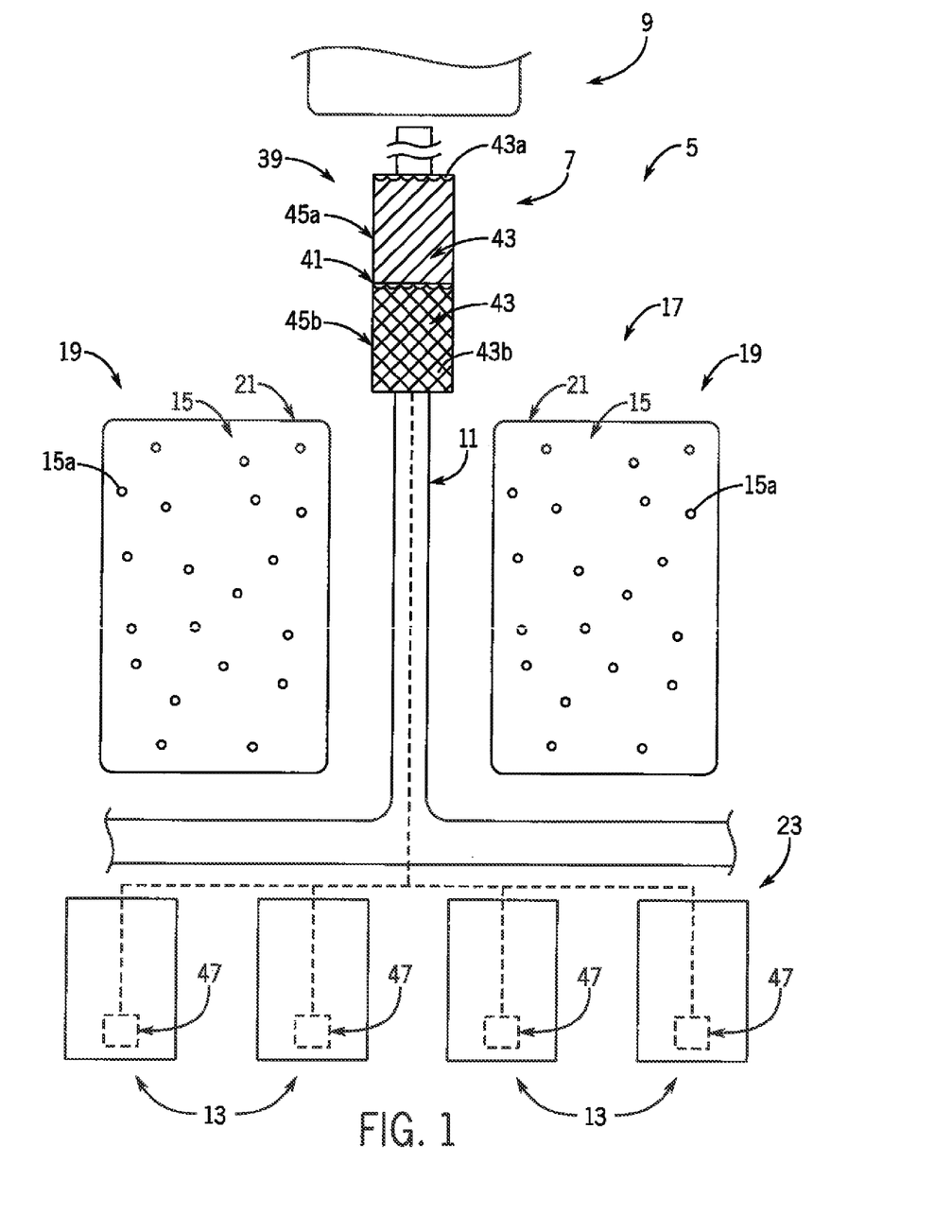
FIG. 1 is a simplified schematic representation of a planter with onboard seed treatment.

Referring now to the drawings and specifically to FIG. 1, planter 5 with on-board seed treatment is shown for treating seeds by way of seed treatment system 7 during row-crop planting of an agricultural field. Planter 5 may be one of the EARLY RISER® series planters available from Case IH and is typically pulled by a traction device such as tractor 9. Planter 5 includes frame 11 that supports multiple row units 13 that are substantially identical. Each row unit 13 includes various support, metering, and ground-engaging components. These may include a sub-frame that is connected to frame 11 by way of a parallel linkage system and furrow opening and closing mechanisms toward front and back ends of the row unit 13. The opening and closing mechanisms may include opener disks and closing disks, respectively, or other ground-engaging tools for opening and closing a furrow. Each row unit 13 may include a gauge wheel configured for adjusting furrow depth by limiting soil penetration of the furrow-opening mechanism while creating the furrow, and a press wheel may be arranged to roll over the opened furrow to close the furrow and to further firm the soil over the seed to promote favorable seed-to-soil contact.

Still referring to FIG. 1, seed 15 is held in seed storage system 17 as untreated seed 15a. Seed 15 may include, but is not limited to, corn, cotton, soybeans, and other seeds that are singulated for row-crop planting. Seed storage system 17 includes a bulk storage system that may be configured for on-row bulk storage with a manual-fill on-row bulk storage hopper at each row unit 13. FIG. 1 shows bulk storage of seed 15 by way of bulk storage system 19 that is configured for central or remote bulk storage with at least one bulk fill hopper 21, shown here as having two central bulk fill hoppers 21. Bulk fill hoppers 21 are supported by the frame 11 of the planter 5, remote from the row units 13.

Figure 2:
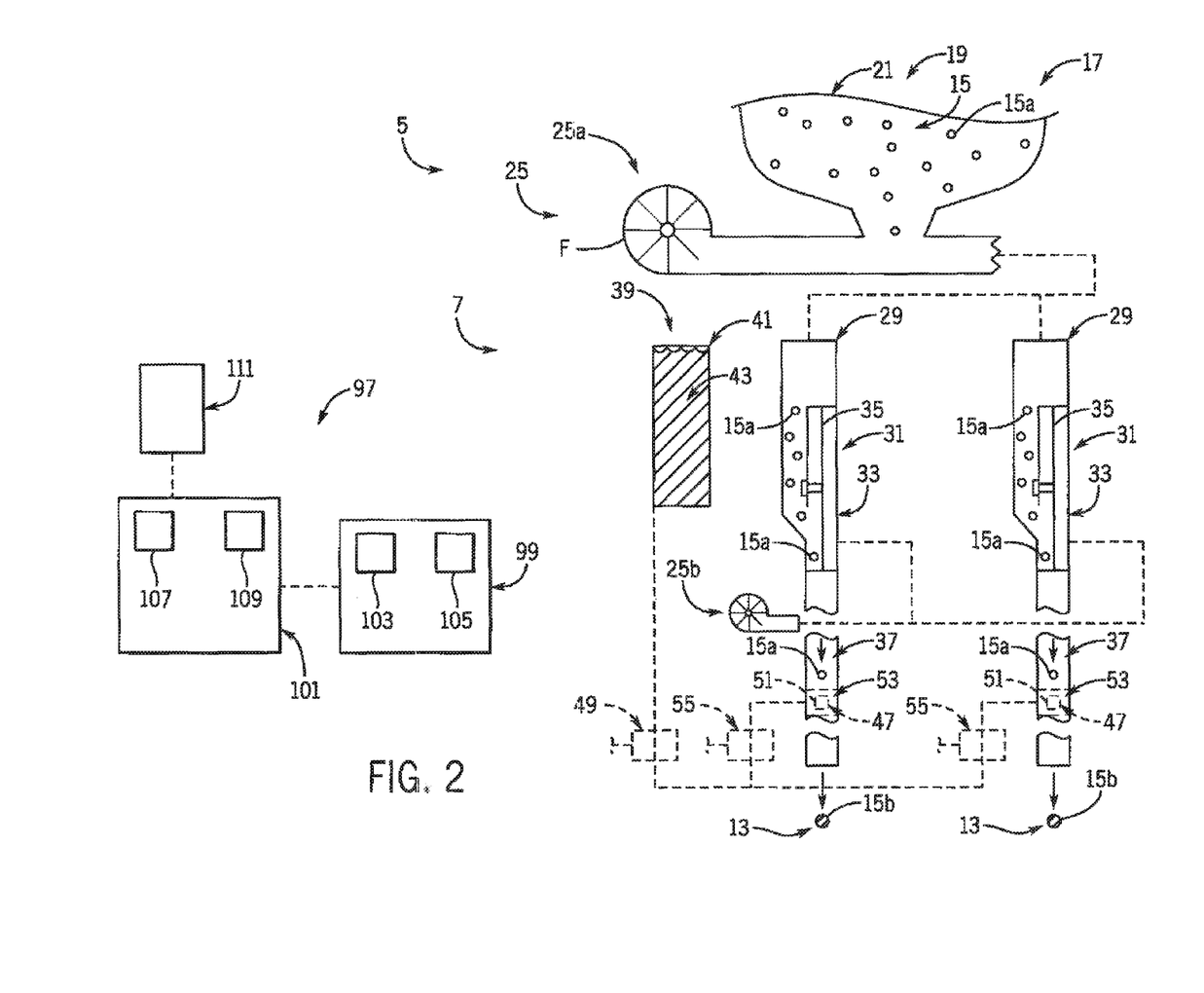
FIG. 2 is a simplified schematic representation of a seed treatment system.

Seeds 15 are released from the bulk storage system 19 for receipt into an on-row storage system 23 of the seed storage system 17 by way of an airflow system 25 (FIG. 2). Referring now to FIG. 2, the airflow system 25 provides pneumatic power for use by various components of the planter 5 and is used to convey seeds 17 through the planter 5 to the row units 13 to be dropped into the seed trench formed by the furrow opening mechanism. Airflow system 25 can include a seed conveyance airflow system 25a providing an airflow by way of fan "F" that entrains seeds 15 to move the seeds 15 from bulk storage system 19 to the on-row storage system 23 feeding the row units 13 and a seed meter airflow system 25b that provides native and/or positive pressure for operation of seed meters at the row units 13, as explained in greater detail elsewhere herein. Each of the seed conveyance and seed meter airflow systems 25a, 25b includes a positive air pressure source(s) and/or vacuum source(s), depending on the particular configurations of the pneumatic system(s) in which they are incorporated.

Referring again to FIG. 1, the on-row storage system 23 locally stores relatively small amounts of seeds 15, such as in a vented mini-hopper 29 (FIG. 2) at each of multiple row units 13 to feed a seed-metering system 31. When on-row bulk storage is implemented, the on-row bulk storage hopper of the particular row unit 13 directly feeds the corresponding seed-metering system 31, such as by gravity. Referring now to FIG. 2, regardless of where the bulk storage is located, seed-metering system 31 receives the untreated seeds 15a from the seed storage system 17 and singulates the untreated seeds 15 for individual release toward the agricultural field. At each row unit 13, seed-metering system 31 includes seed meter 33. Each seed meter 33 can be a purely mechanical-type seed meter 33 or a pneumatic seed meter 33. Referring now to FIG. 2, the seed meter 33 includes a housing that defines a cavity in which various components are arranged, including an internal seed disk 35 that is rotated to move at least a surface of the seed disk 35 through a seed pool inside of the seed meter 33 to pick up and singulate seeds 15 using seed pockets or fingers from the internal seed pool and convey the individual seeds 15 through the seed meter 33 for individual release out of the seed meter 33 through seed tube 37 toward a seed trench of the agricultural field as either untreated seeds 15a or treated seeds 15b. Pneumatic seed meters 33 of negative pressure types are further operably connected through a vacuum inlet to the seed meter airflow system 25b (FIG. 2) of the airflow system 25 to provide a vacuum airflow within a vacuum chamber establishing a negative or vacuum pressure within the seed meter 33 opposite the seed pool allowing the seeds to be held against the seed disk such as within the seed pockets by the vacuum pressure. Pneumatic seed meters 33 of positive pressure types are operably connected through a pressurized air inlet to the seed meter airflow system 25b (FIG. 2) to provide a positive airflow and a corresponding positive pressure at the seed side of the seed disk 35 within the seed meter 33, whereby seeds from the seed pool are pushed and held against the seed disk such as within the seed pockets by positive pressure. A seed singulator that is adjustable, such as remotely adjustable is arranged in the cavity of the seed meter 33. The singulator is configured to inhibit more than one seed from being discharged from the seed meter 33 per seed discharge event. A baffle that is adjustable, such as remotely adjustable, is arranged in the cavity of the seed meter 33 and is configured to control the depth of seed in the meter that is exposed to the seed disk 35. Rotation of the seed disk 35 including speed of rotation is adjustable such as remotely adjustable by controlling a seed disk drive system. The seed disk drive system may include, for example, various electric or hydraulic motors, drive shafts, chains, and belts, clutches, peg and hole drive systems, and/or other arrangements such as a directly driven arrangement in which a motor directly drives the seed disk at its hub or periphery. The seed meters 33 are operably connected to a control system for controlling the seed describes system to adjust seed disk 35 rotational speed for adjusting the seed population, as well as for controlling seed singulator setting, vacuum level, baffle position, and/or seed depth inside the seed meter 33 reservoir.

Referring again to FIG. 1, seed treatment system 7 includes treatment storage system 39 with tank 41 that is configured to store a volume of liquid seed treatment 43 on planter 5. Liquid seed treatment 43 includes aqueous or other solutions or suspensions carrying pesticides such as insecticides, herbicides, fungicides, disinfectants, fertilizers as macronutrients such as nitrogen, phosphorus, and potassium and/or micronutrients or trace elements such as zinc, and molybdenum. As shown in FIG. 1, treatment storage system 39 can store multiple liquid seed treatments 43, represented as different liquid seed treatments shown as first and second liquid seed treatments 43a, 43b separately stored in multiple containers 45a, 45b. FIG. 1 shows the containers 45a, 45b in the same tank 41, separated from each other by a divider wall, although it is understood that the containers may instead be provided by separate tanks 41. Seed treatment system 7 includes treatment application system 47 that treats the untreated seeds 15a by applying a liquid seed treatment(s) 43 while the seeds 15 are being directed toward the field.

Referring again to FIG. 2, applying the liquid seed treatment(s) 43 to the untreated seeds 15a is performed during seed treatment events that convert the untreated seeds 15a to treated seeds 15b while the seeds 15 are delivered from the seed metering system 31 to the agricultural field. Treatment application system 47 includes various tubing, fittings, pumps, and other plumbing-type components for moving the liquid seed treatment(s) 43 from the treatment storage system 39 to the row units 13. Transfer pump 49 is arranged between the tank 41 of treatment storage system 39 and the row units 13 for delivering the liquid seed treatment(s) 43 toward treatment nozzles 51 that are arranged at treatment sections 53 of the seed tubes 37 for applying the liquid seed treatment(s) 43 to the untreated seeds 15a during the treatment events.

Figure 3:
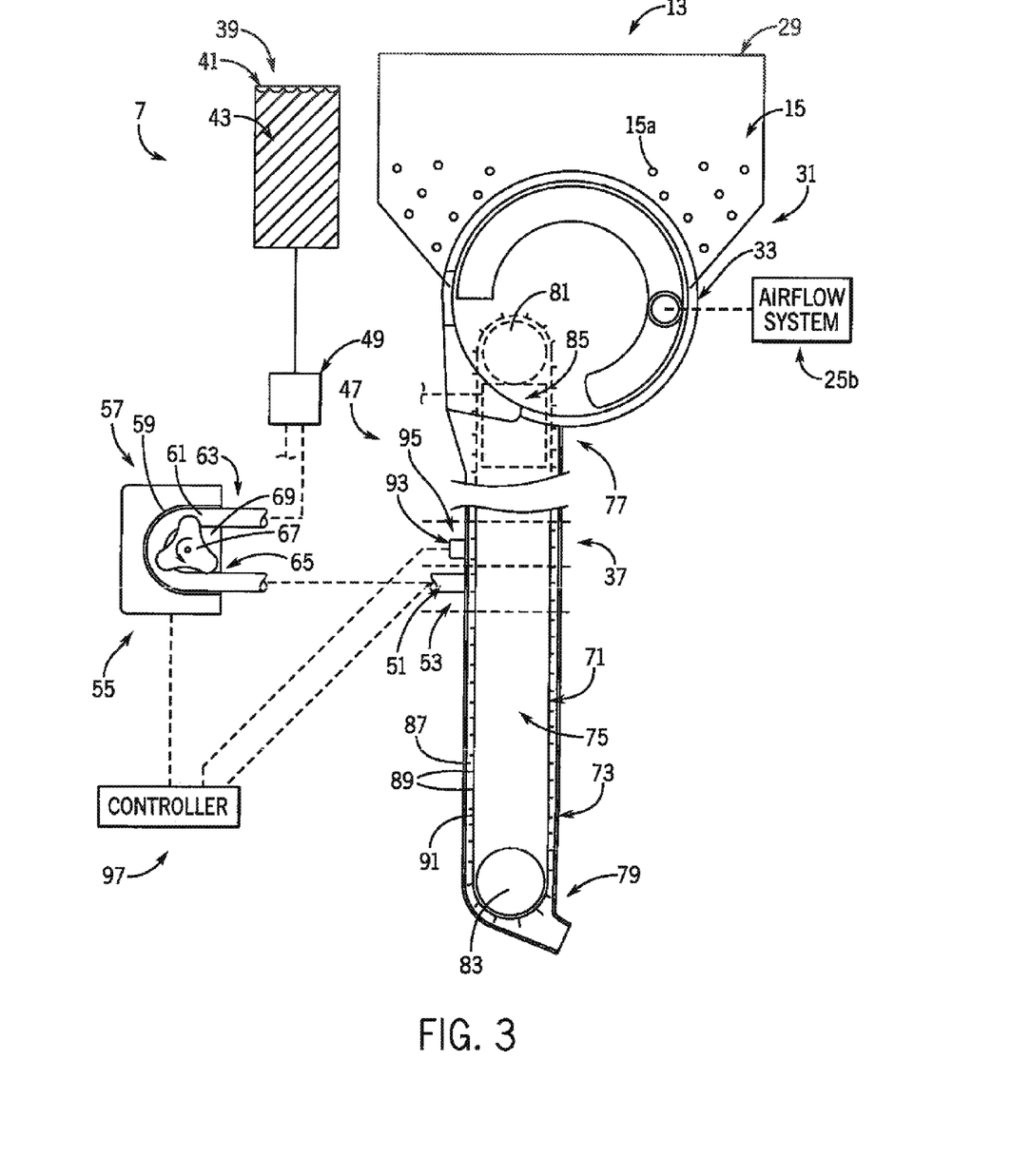
FIG. 3 is a simplified schematic representation of a seed treatment system at a row unit.
Figure 4:
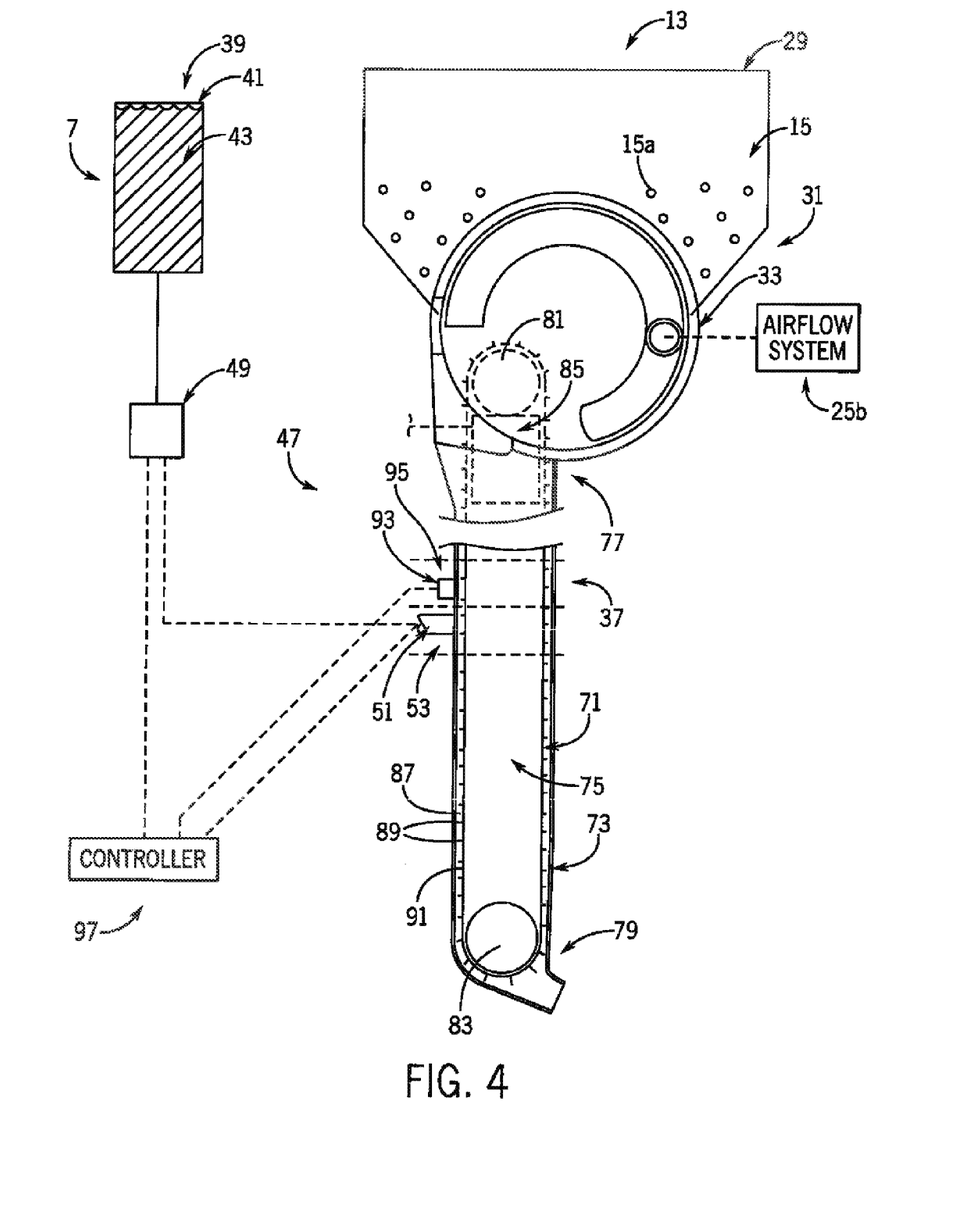
FIG. 4 is a simplified schematic representation of another seed treatment system at a row unit.

Referring now to FIGS. 3 and 4, treatment application system 47 is shown configured to deliver the liquid seed treatment(s) 43 in discrete pulses in a proper amount to coat the seeds 15 and at a proper timing through the treatment nozzles 51 during the seed treatment events by timing the seed treatment events to the passing of untreated seed 15a through the treatment section 53 of seed tube 37. Referring now to FIG. 3, pulsed delivery is achieved upstream of the treatment nozzle 51 with a pump shown as treatment pump 55 configured to deliver the liquid seed treatment to the untreated seeds in discrete pulses during the seed treatment events. Treatment pump 55 may be a peristaltic pump that delivers liquid in discrete pulses. Treatment pump 55 has a pump housing 57 defining a pump cavity 59 and a hose 61 arranged with the pump cavity 59 with one end that defines an inlet 63 of the treatment pump 55 that receives liquid seed treatment(s) 43 from transfer pump 49 and a second end that defines an outlet 65 of the treatment pump 55. Outlet 65 of treatment pump 55 delivers liquid seed treatment(s) 43 to treatment nozzle 51 in pulsed discrete volumes of liquid that are moved by rotation of rotor 67 within the pump cavity 59. Lobes of rotor 67 engage the hose 61 within the cavity 59 so that rotation of rotor 67 progressively squeezes the hose 61, providing a peristaltic pulsed delivery of liquid out of treatment pump 55. Pump drive 69 includes a motor such as an electric motor that is controlled to drive rotation of rotor 67 at a variable rotational speed to synchronize delivery of the liquid seed treatment(s) 43 to the times at which the seeds 15 are traveling through treatment section 53 of seed tube 37.

Referring now to FIG. 4, pulsed delivery is achieved at the treatment nozzle(s) 51 with the treatment nozzle 51, itself, configured to deliver the liquid seed treatment(s) 43 in discrete pulses during the seed treatment events. The treatment nozzle 51 may be a piezoelectric nozzle configured to release bursts of the liquid seed treatment(s) 43 during corresponding seed treatment delivery events. The transfer pump 49 can continuously pump to maintain pressure at the treatment nozzle 51 and the treatment nozzle is selectively energized to deliver the pressurized liquid seed treatment(s) 43 at times that are synchronized to seeds 15 traveling through treatment section 53 of seed tube 37.

Referring again to FIGS. 3 and 4, pulsed delivery of the liquid seed treatment(s) 43 into treatment section 53 of seed tube 37 is coordinated to the seeds traveling along a tightly defined travel path and substantially regular time spacing in seed tube 37, shown here with the seed travel path and timing delineated by a belt 71. Seed tube 37 includes seed tube housing 73 that surrounds a cavity 75 in which belt 71 is arranged to rotate. Seed tube housing 73 has an upper end 77 defining an inlet that receives singulated seeds 15 released from the seed meter 33 and a lower end 79 that directs seeds 15 out of the seed tube 37 toward the field, with belt 71 moving the singulated seeds 15 from upper end 77 to lower end 79 of seed tube 37. Belt 71 is supported for rotation at upper and lower belt ends on upper and lower pulleys 81, 83 at upper and lower ends 77, 79 of speed tube 37. Upper pulley 81 is driven by belt drive 85 that directly includes a motor, such as an electric motor, or may include a gear train transmitting rotation of an output shaft of the motor to rotation of upper pulley 81 Rotation of upper pulley 81 drives rotation of belt 71 to pass seeds 15 through treatment section 53 of the seed tube 37 and delivers seeds 15 out of seed tube 37 toward the field. Belt 71 has outer belt surface 87 with outwardly extending belt fingers 89, between which belt pockets 91 are defined that individually carry the singulated seeds 15 through the seed tube 37 during rotation of belt 71. A seed sensor shown as sensor 93 is arranged for detecting presence or absence of seeds 15 of belt pockets 91 of belt 71. Sensor 93 may be an infrared and/or other sensor configured to detect the presence or absence of seeds 15 in belt pockets 91. Sensor 93 is shown arranged at sensor section 95 of seed tube 37, upstream of treatment section 53 of seed tube 37. Detected presence or absence of a seed 15 within the belt pocket 91 by way of sensor 93 influences whether liquid seed treatment(s) 43 will be sprayed into the corresponding belt pocket 91, whereby seed treatment system 7 can ensure that liquid seed treatment(s) 43 is only sprayed or applied when there is a seed 15 in the treatment section 53 a seed tube 37 to prevent spraying liquid seed treatment(s) 43 into empty belt pockets 91.

Figure 5:
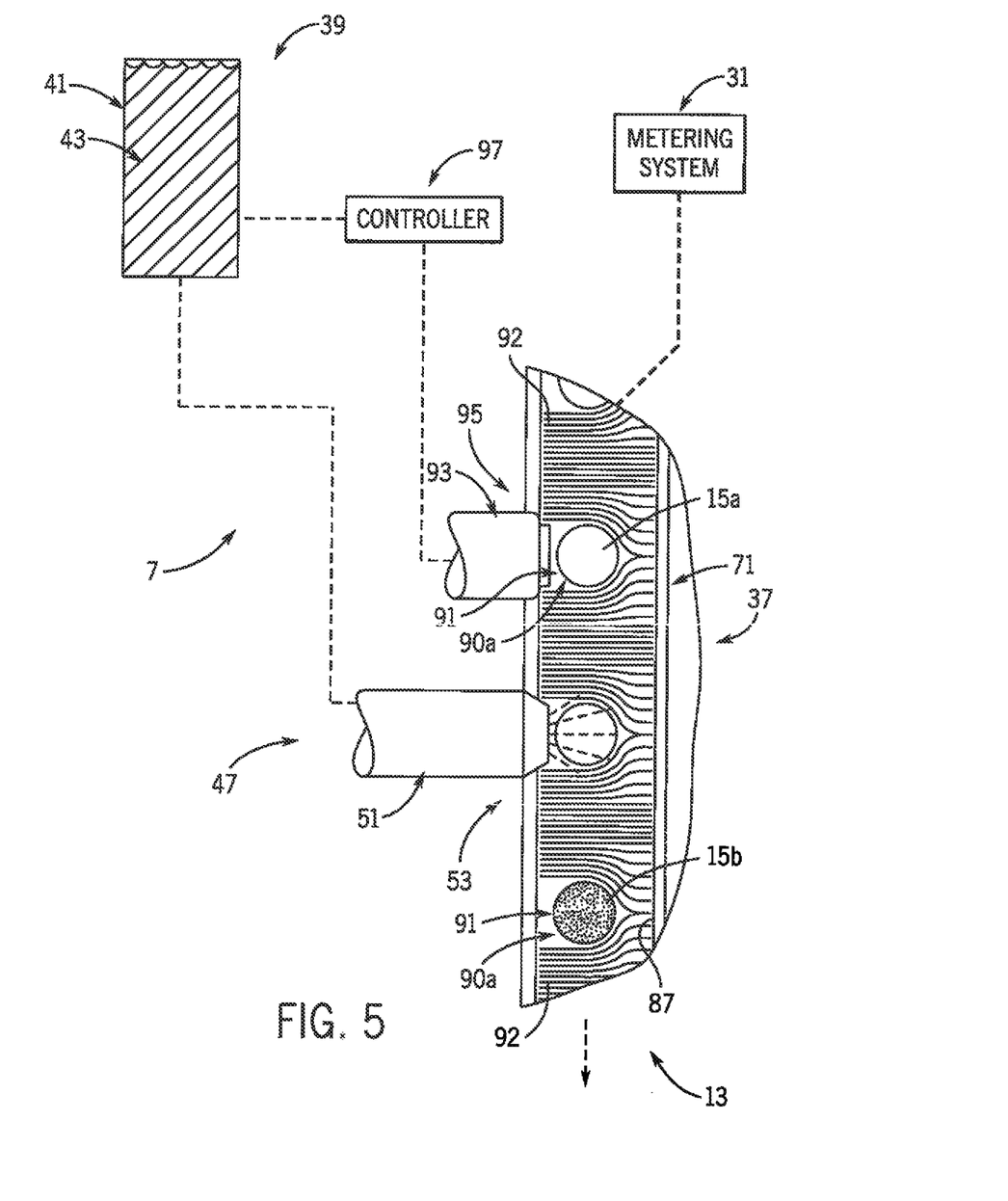
FIG. 5 is a simplified schematic representation of another seed treatment system at a row unit.
Figure 6:
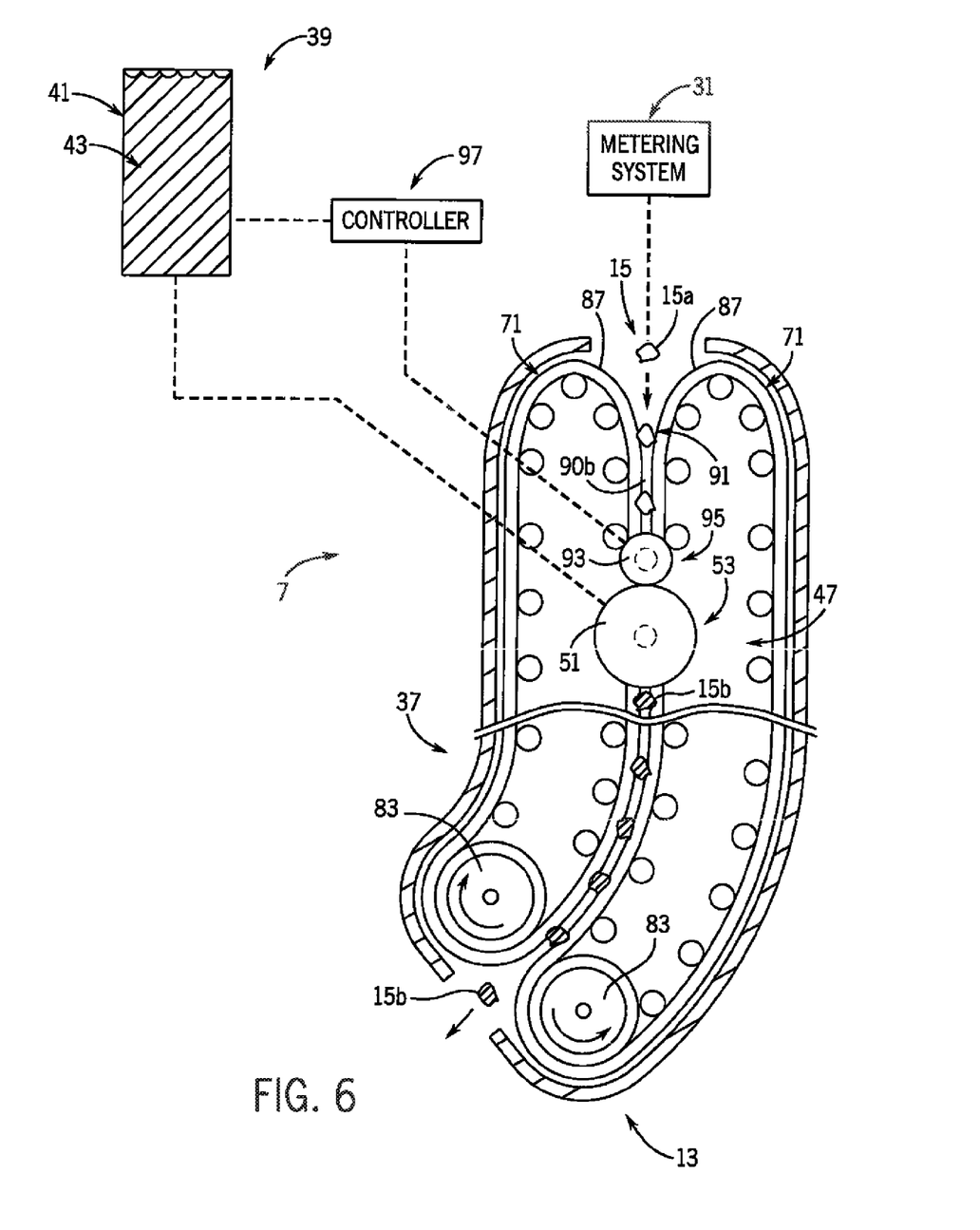
FIG. 6 is a simplified schematic representation of another seed treatment system at a row unit.

Referring now to FIGS. 5-6, treatment application system 47 may include pulsed pump or nozzle delivery like those of FIGS. 3 and 4, respectively. The belts 71 illustrated in FIGS. 5-6 differ from those shown in FIGS. 3 and 4 in that the belts 71 of FIGS. 5-6 do not have belt fingers 89 separating the belt pockets 91. Referring now to FIG. 5, belt 71 is shown as a brush-style rotating belt with belt pockets 91 defined by spaces 90*a* provided by openings between bristles 92 that deflect around the singulated seeds 15 received from seed-metering system 31 to carry the seeds 15 through the seed tube 37. Treatment nozzle 51 and sensor 93 face toward tip ends of the bristles 92 for respectively delivering liquid seed treatment 43 and detecting the presence of untreated seeds 15*a*. Referring now to FIG. 6, seed tube 37 has a pair of counter-rotating belts 71 that are spaced from each other to provide the belt pockets 91 in a space(s) 90*b* defined in a gap between the outer belt surfaces 87 of belts 71. The width of the gap providing space(s) 90*b* is adjusted so that the outer belt surfaces 87 of belts 71 frictionally engage and may slightly deflect to conform to the outer surfaces of seeds 15 to provide a pinching holding force to the seeds 15 so that rotation of the belts 71 carries the seeds 15 through the seed tube 37 while maintaining constant spacing between the seeds 15 in the belt pockets 91. Treatment nozzle 51 and sensor 93 are arranged perpendicular to the length of seed tube 37 or parallel axes of rotation of lower pulleys 83. Treatment nozzle 51 and sensor 93 face toward a side opening of the gap between the belts 71 for respectively delivering liquid seed treatment 43 and detecting presence of untreated seeds 15*a* in the belt pockets 91 of space(s) 90*b*.

Referring now to FIGS. 2-6, coordination of timing and spray volume of seed treatment events is controlled by control system 97. Referring now to FIG. 2, control system 97 includes a planter controller 99 and a tractor controller 101 that operably communicate with each other, for example, by way of an ISOBUS connection, for coordinating controls of planter 7, including which liquid seed treatment 43*a*, 43*b* (FIG. 1) to apply to the untreated seeds 15*a*. Control system 97 can control if and which seed treatment 43*a*, 43*b* (FIG. 1) to apply to the untreated seeds 15*a* based on which section(s) or zone(s) of a field is being planted, such as those represented as treatment zones TZ1, TZ2, TZ3 shown in prescription map PM in FIG. 9.

Planter controller 99 is shown including a controller 103 and power supply 105. The controller 103 of the planter controller can include an industrial computer or, e.g., a programmable logic controller (PLC), along with corresponding software and suitable memory for storing such software and hardware including interconnecting conductors for power and signal transmission for controlling electronic, electro-mechanical, and hydraulic components of planter 5. The tractor controller 101 is configured for controlling operations of the tractor 9 such as controlling steering, speed, braking, shifting, and other operations of the tractor 9. In FIG. 2, tractor controller 101 is shown including a controller 107 and power supply 109. The tractor controller 101 is configured for controlling the functions of the tractor 9 by controlling the various GPS steering, transmission, engine, hydraulic, and/or other systems of tractor 9. Like the controller 103 of planter controller 99, the controller 107 of the tractor controller 101 can include an industrial computer or, e.g., a programmable logic controller, along with corresponding software and suitable memory for storing such software and hardware including interconnecting conductors for power and signal transmission for controlling electronic, electro-mechanical, and hydraulic components of the tractor 9. A tractor interface system 111 is operably connected to the tractor controller 101 and includes a monitor and various input devices to allow an operator to see the statuses and control various operations of tractor 9 from within the cab of tractor 9. The tractor interface system 111 may be a Multi-Control Armrest™ console available for use with the Maxxum™ series tractors from Case IH or may be implemented as various HMIs (human machine interfaces) of field computers or other displays or interfaces.

Figure 9:
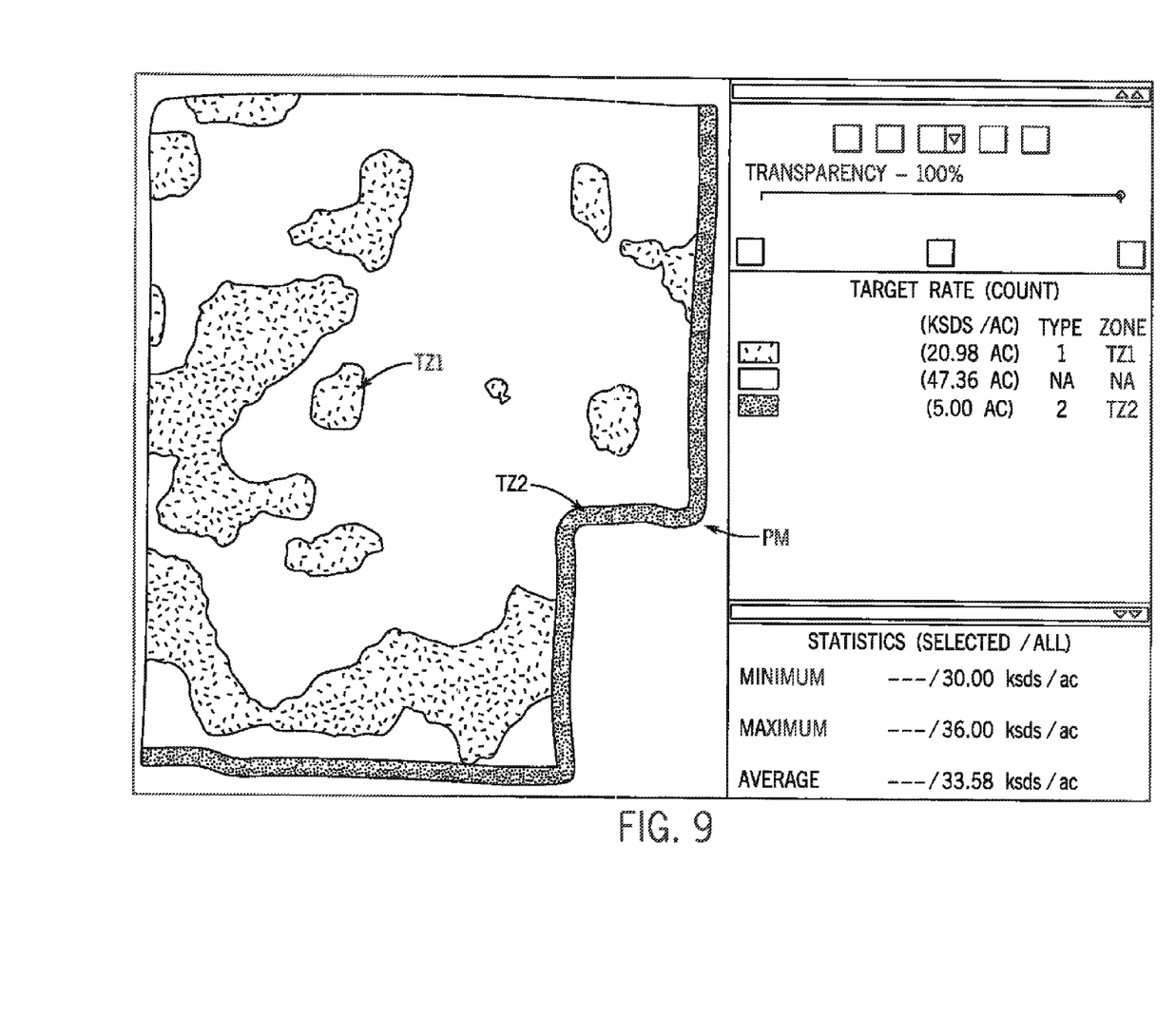
FIG. 9 is an example of a seed treatment prescription map for use with the planter.

During use, control system 97 can determine planter position, speed, heading, and/or other movement characteristics by way of monitoring tractor position and movement through the tractor controller 101. Tractor controller 101 evaluates a speed input signal from a tractor speed sensor or other speed indicator along with a GPS signal or data from tractor GPS with respect to the prescription map PM (FIG. 9). Using such evaluations, control system 97 determines whether seeds 15 should be planted as untreated seeds 15a or treated seeds 15b. If control system 97 determines that treated seeds 15b are to be planted, and if multiple liquid seed treatment 43a, 43b are being implemented with seed treatment system 7, then control system 97 can further determine which of the multiple liquid seed treatments should be applied to convert untreated seeds 15a to treated seeds 15b during seed treatment events while planting.

Figure 7:
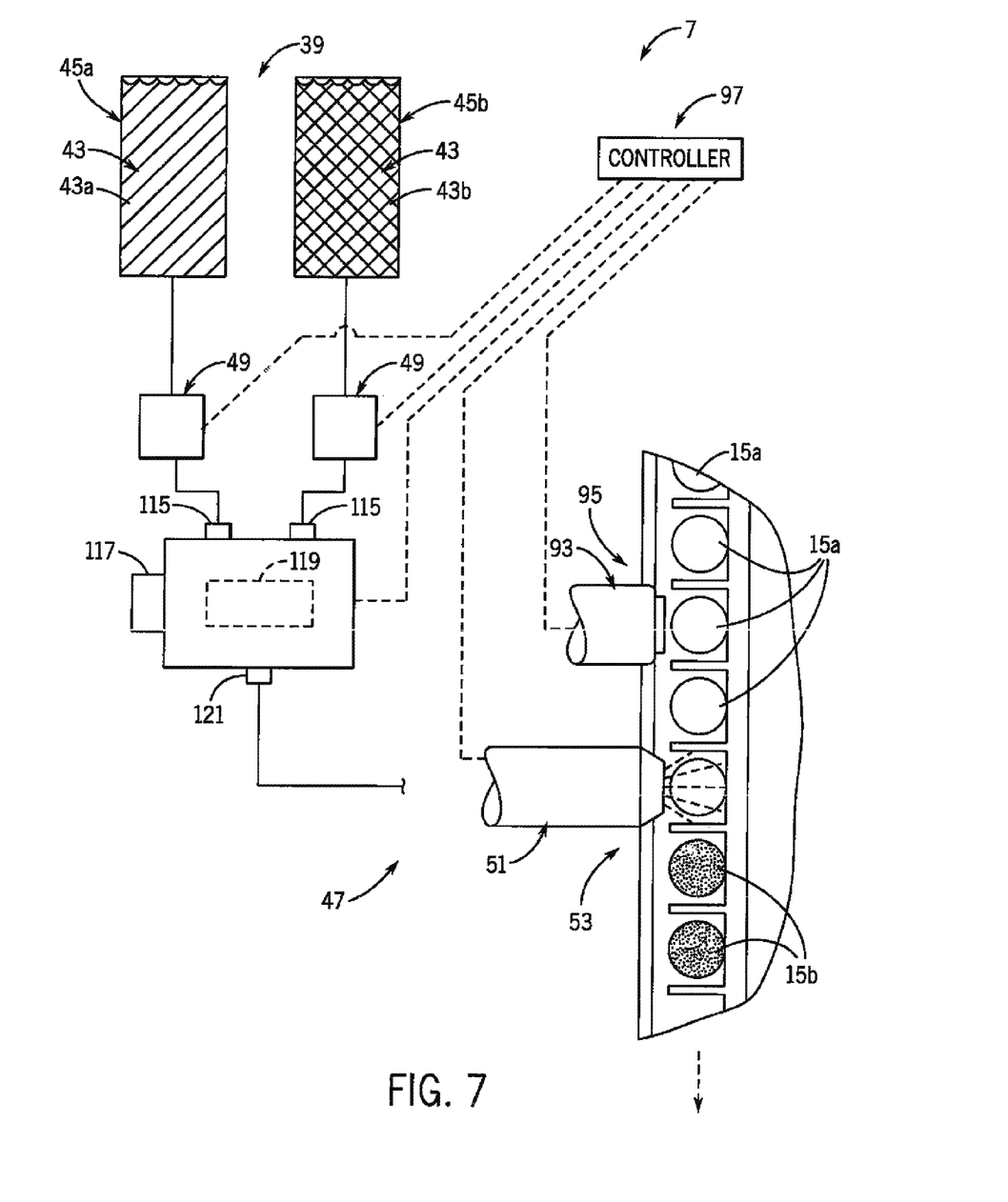
FIG. 7 is a simplified schematic representation of a portion of a seed treatment system.
Figure 8:
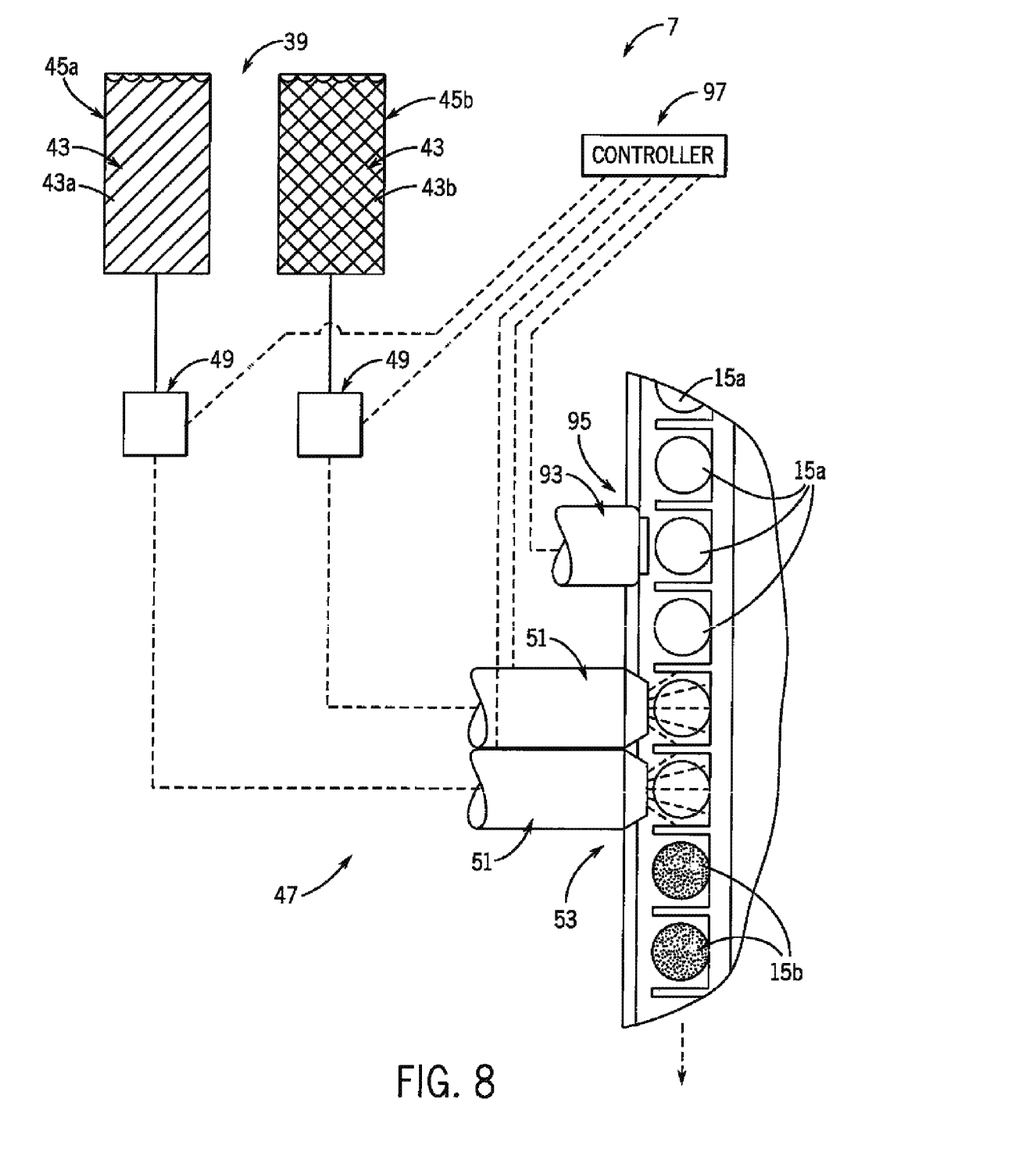
FIG. 8 is another simplified schematic representation of a portion of another seed treatment system.

Referring now to FIGS. 7 and 8, seed treatment system 7 can apply different liquid seed treatment 43a, 43b through a single treatment nozzle 51 (FIG. 7) or multiple treatment nozzles 51 (FIG. 8), which may include controlling treatment pump(s) 55 (FIG. 3) and/or nozzle(s) 51 (FIG. 4) by way of control system 97. Referring now to FIG. 7, selector valve assembly 113 is arranged between the first and second treatment storage tanks or containers 45a, 45b and the treatment section 53 of the seed tube 37 to control which the liquid seed treatments 43a, 43b is fed to treatment nozzle 51. Selector valve assembly 113 includes two inlets 115 and solenoids or other actuator(s) 117 to move an internal valve body 119 to control which liquid(s) flows out of outlet 121 to feed treatment nozzle 51. Control system 97 actuates valve body 119 to a first position to block all liquid of liquid seed treatments 43a, 43b from flowing out of outlet 121 for planting untreated seeds 15a. Control system 97 actuates valve body 119 to a second position to allow liquid flow of the first liquid seed treatment 43a to feed treatment nozzle 51 for applying the first liquid seed treatment 43a to untreated seeds 15a which may be detected by sensor 93. Control system 97 actuates valve body 119 to a third position to allow liquid flow of the second liquid seed treatment 43b to feed treatment nozzle 51 for applying the second liquid seed treatment 43b to untreated seeds 15a which may be detected by sensor 93. Control system 97 actuates valve body 119 to a fourth position to allow liquid flow of both the first and second liquid seed treatments 43a, 43b to feed treatment nozzle 51 for simultaneously applying both the first and second liquid seed treatments 43a, 43b to untreated seeds 15a which may be detected by sensor 93. Referring now to FIG. 8, the first and second treatment nozzles 51 are for respectively applying the first and second liquid seed treatments 43a, 43b. Control system 97 commands the first liquid seed treatment 43a to spray out of the corresponding treatment nozzle 51, shown as the lower treatment nozzle 51, for applying the first liquid seed treatment 43a to untreated seeds 15a which may be detected by sensor 93. Control system 97 commands the second liquid seed treatment 43a to spray out of the corresponding treatment nozzle 51, shown as the upper treatment nozzle 51, for applying the second liquid seed treatment 43b to untreated seeds 15a which may be detected by sensor 93. Control system 97 commands the first and second liquid seed treatments 43a, 43b to spray out of the corresponding treatment nozzles 51 for applying both the first and second liquid seed treatments 43a, 43b to untreated seeds 15a which may be detected by sensor 93.

To use the planter 5, an operator first displays the prescription map PM (FIG. 9) on the computer display or monitor of the tractor interface system 111 (FIG. 2), which would typically be inside the tractor cab. The prescription map PM displays zones that correspond to different seed treatment types. In the illustrated prescription map PM, the unmarked or NA zone corresponds to segments of the field that can be planted with untreated seeds 15a. Treatment zone TZ1 shows segments of the field that should be planted with the seeds 15 treated with the first liquid seed treatment 43a. Treatment zone(s) TZ1 may correspond to sections of the field with soil that is element deficient, for example, zinc, whereby the first liquid seed treatment 43a may include zinc or other deficient element(s). Treatment zone(s) TZ2 shows segments of the field that may benefit from having a boundary treatment segment(s) planted. This may correspond to boundaries of the field that abuts neighboring fields with a known infestation. As one example, if neighboring fields at the respective boundaries are known to have root worm infestation, then treatment zone TZ2 shows segments of the field mission be planted with seeds 15 treated with the second liquid seed treatment 43b that has insecticide for protecting against root worm. While planter 5 moves through the field, control system 97 evaluates the current treatment zone and correspondingly commands seed treatments system 7 to allow planter 5 to plant untreated seeds 15a, or to treat the untreated seeds 15a on the go so that treated seeds 15b are released from planter 5 downstream of the seed metering system 31.

Many changes and modifications could be made to the invention without departing from the spirit thereof. Various components and features of the system 7, for example, components, or features of the seed storage system(s), seed conveyance system(s), seed metering system(s), and treatment application system(s) can be incorporated alone or in different combinations on a planter. The scope of these changes will become apparent from the appended claims.

I claim:

1. A planter with on-board seed treatment for treating seeds during row-crop planting of an agricultural field, the planter comprising:
 a frame supporting multiple row units;
 a seed storage system storing untreated seeds on the planter;
 a seed-metering system at each of the multiple row units selectively receiving the untreated seeds from the seed storage system and singulating the untreated seeds for individual release toward the agricultural field; and
 a seed treatment system including a treatment storage system configured to store a volume of liquid seed treatment on the planter and a treatment application system configured to apply the liquid seed treatment to the untreated seeds while the untreated seeds are delivered from the seed metering system to the agricultural field to convert the untreated seeds to treated seeds during seed treatment events while planting; wherein each row unit comprises a seed tube configured to direct the individual seeds released from the seed-metering system toward the agricultural field and the treatment application system is configured to apply the liquid seed treatment to the untreated seeds while the untreated seeds are in the seed tube to convert the untreated seeds to treated seeds during the seed treatment events; wherein the seed tube comprises a treatment section and wherein the liquid seed treatment is applied to the untreated seeds at the treatment section of the seed tube; wherein the seed tube includes a seed tube housing surrounding an interior seed tube housing cavity, and a belt is arranged to rotate within the seed tube housing cavity for directing the untreated seeds through the treatment section of the seed tube and out of the seed tube as treated seeds toward the agricultural field; wherein the belt has an outer belt surface and belt fingers extending outwardly from the outer belt surface with belt pockets defined between adjacent pairs of the belt fingers, and wherein the belt pockets are configured to receive untreated seeds from the seed-metering system and convey the untreated seeds through the treatment section of the seed tube to receive the liquid seed treatment during the seed treatment events and direct the treated seeds out of the seed tube toward the agricultural field; wherein the treatment application system comprises a pump configured to deliver the liquid seed treatment to the untreated seeds in discrete pulses during the seed treatment events.

2. The planter of claim 1 wherein the pump is a peristaltic pump configured to deliver the liquid seed treatment in discrete pulses to the untreated seeds during the seed treatment events.

3. The planter of claim 2 wherein the peristaltic pump includes a pump housing defining a pump cavity, a hose arranged with the pump cavity directing the liquid seed treatment through the pump, and a rotor arranged within the pump cavity and configured to rotate and engage the hose while rotating to progressively squeeze the hose for delivering the treatment liquid out of the peristaltic pump during the seed treatment events.

4. The planter of claim 1 wherein treatment application system includes a treatment nozzle that is arranged at the treatment section of the seed tube for delivering the liquid seed treatment into the seed tube housing cavity during the seed treatment events.

5. The planter of claim 4 wherein the treatment nozzle is configured to deliver the liquid seed treatment in discrete pulses during the seed treatment events.

6. The planter of claim 5 wherein the treatment nozzle is a piezoelectric nozzle configured to release bursts of the liquid seed treatment during corresponding seed treatment delivery events.

7. The planter of claim 1 wherein the seed tube comprises a sensor section arranged upstream of the treatment section of the seed tube for detecting untreated seeds passing through the seed tube for coordinating application of the liquid seed treatment to the untreated seeds during the seed treatment events.

8. The planter of claim 7 wherein the belt includes belt pockets configured to receive singulated untreated seeds from the seed-metering system and convey the singulated untreated seeds from the seed-metering system toward the agricultural field, and wherein the sensor section includes a sensor arranged for detecting presence of untreated seeds in corresponding belt pockets for coordinating discrete releasing of bursts of the liquid seed treatment during the seed treatment events.

9. The planter of claim 1 wherein the treatment storage system includes a first treatment storage container holding a first liquid seed treatment and a second treatment storage container holding a second liquid seed treatment, and the treatment application system includes a selector valve assembly arranged between the first and second treatment storage containers and the treatment section of the seed tube, wherein the selector valve assembly is configured to actuate for selectively directing at least one of the first and second liquid seed treatments to the treatment section of the seed tube.

10. The planter of claim 1 wherein the treatment storage system includes a first treatment storage container holding a first liquid seed treatment and a second treatment storage container holding a second liquid seed treatment, and wherein the treatment application system includes:
   a first treatment nozzle arranged at the treatment section of the seed tube receiving the first liquid seed treatment from the first treatment storage container for delivery of the first liquid seed treatment at the treatment section of the seed tube during seed treatment events of the first liquid seed treatment; and
   a second treatment nozzle arranged at the treatment section of the seed tube receiving the second liquid seed treatment from the second treatment storage container for delivery of the second liquid seed treatment at the treatment section of the seed tube during seed treatment events of the second liquid seed treatment.

11. A planter with on-board seed treatment for treating seeds during row-crop planting of an agricultural field, the planter comprising:
   a frame;
   a seed storage system supported by the frame and storing untreated seeds;
   multiple row units supported by the frame, each of the multiple row units including:
      a seed-metering system having a seed meter receiving the untreated seeds from the seed storage system and singulating the untreated seeds for individual release toward the agricultural field:
      a seed tube receiving the singulated untreated seeds from the seed meter and defining a treatment section;
      a seed treatment system including a treatment storage system storing a volume of liquid seed treatment on the planter and a treatment application system including a treatment nozzle receiving the liquid seed treatment from the treatment storage system and arranged at the treatment section of the seed tube to apply the liquid seed treatment to the untreated seeds while the untreated seeds move through the treatment section of the seed tube to convert the untreated seeds to treated seeds in the seed tube during seed treatment events while planting; and
      a belt arranged in the seed tube and including belt pockets configured to receive singulated untreated seeds from the seed-metering system and convey the singulated untreated seeds from the seed-metering system toward the agricultural field, and wherein the seed tube defines a sensor section with a sensor arranged for detecting presence of untreated seeds in corresponding belt pockets for coordinating discrete releasing of bursts of the liquid seed treatment onto the untreated seeds during the seed treatment events.

12. The planter of claim 11 wherein the treatment storage system includes a first treatment storage container holding a first liquid seed treatment and a second treatment storage container holding a second liquid seed treatment, wherein each of the first and second liquid seed treatments includes at least one of a pesticide, an herbicide, and a fertilizer, and wherein the treatment application system includes a pump configured to deliver at least one of the first and second liquid seed treatments to the untreated seeds in the treatment section of the seed tube in discrete pulses during the seed treatment events.

13. A method of on-board seed treatment during row-crop planting of an agricultural field, the method comprising:

storing untreated seeds on a planter having multiple row units;

storing a volume of liquid seed treatment on the planter;

delivering the untreated seeds to a seed meter at each row unit for singulating the seeds for individual release onto the agricultural field;

releasing the untreated seeds from the seed meter at each row unit into a seed tube having a belt with belt pockets receiving the singulated untreated seeds from the seed meter;

delivering the liquid seed treatment to a treatment section of the seed tube;

applying the liquid seed treatment to the untreated seeds while the untreated seeds move through a treatment section of the seed tube by releasing bursts of the liquid seed treatment into the belt pockets to convert the untreated seeds to treated seeds in the treatment section of the seed tube during seed treatment events while planting;

detecting presence of untreated seeds in the belt pockets and coordinating release of the burst of the liquid seed treatment into the belt pockets based on the detected presence of untreated seeds in the belt pockets.

\* \* \* \* \*